(12) United States Patent
Latiri

(10) Patent No.: US 10,792,548 B2
(45) Date of Patent: Oct. 6, 2020

(54) MECHANICAL STATIC AND DYNAMIC MEASURING DEVICE BASED ON A COMPOUND CANTILEVERED SYSTEM

(71) Applicant: Technorama Co., Ltd., Kaohsiung (TW)

(72) Inventor: Mondher Latiri, Kaohsiung (TW)

(73) Assignee: Technorama Co., Ltd., Kaohsiung (TW)

( * ) Notice: Subject to any disclaimer, the term of this patent is extended or adjusted under 35 U.S.C. 154(b) by 152 days.

(21) Appl. No.: 15/984,893

(22) Filed: May 21, 2018

(65) Prior Publication Data
US 2018/0345105 A1 Dec. 6, 2018

(30) Foreign Application Priority Data

Jun. 7, 2017 (TW) .............................. 106208187 U

(51) Int. Cl.
| | |
|---|---|
| *A63B 60/46* | (2015.01) |
| *G01M 1/12* | (2006.01) |
| *G01M 1/10* | (2006.01) |
| *G01G 19/52* | (2006.01) |
| *G01B 5/00* | (2006.01) |
| *A63B 60/42* | (2015.01) |
| *G01B 5/02* | (2006.01) |
| *A63B 71/06* | (2006.01) |

(52) U.S. Cl.
CPC .............. *A63B 60/46* (2015.10); *A63B 60/42* (2015.10); *G01B 5/0023* (2013.01); *G01B 5/02* (2013.01); *G01G 19/52* (2013.01); *G01M 1/10* (2013.01); *G01M 1/122* (2013.01); *A63B 71/0622* (2013.01); *A63B 2220/00* (2013.01); *A63B 2220/20* (2013.01); *A63B 2220/51* (2013.01); *A63B 2220/803* (2013.01); *A63B 2220/805* (2013.01)

(58) Field of Classification Search
CPC ..... A63B 60/46; A63B 60/42; A63B 2220/00; A63B 71/0622; A63B 2220/51; A63B 2220/803; A63B 2220/20; A63B 2220/805; G01G 19/52; G01B 5/0023; G01B 5/02; G01M 1/122; G01M 1/10
USPC ....................................................... 73/65.03
See application file for complete search history.

(56) References Cited

U.S. PATENT DOCUMENTS

| | | | | | |
|---|---|---|---|---|---|
| 1,897,027 | A | * | 2/1933 | Gumprich ................ | G01G 1/00 73/65.01 |
| 2,595,717 | A | * | 5/1952 | Smith ..................... | G01G 19/00 73/65.03 |
| 4,043,184 | A | * | 8/1977 | Sayers .................... | G01M 1/10 73/65.03 |

(Continued)

*Primary Examiner* — Marrit Eyassu
(74) *Attorney, Agent, or Firm* — Leydig, Voit & Mayer, Ltd.

(57) ABSTRACT

A measuring device includes a base station, a weight station unit and a controller. A mount station unit is connected to the weight station unit and has first and second mounting bases connected by a swing arm. The first mounting base is moveably supported on the first weight scale, and the second mounted base is moveably supported on the second weight scale. An adjustable holding part is disposed at one end of the first mounting base and a support is disposed at another end of the first mounting base adjacent the swing arm. A sports article is mountable on the first mounting base between the adjustable holding part and the support.

20 Claims, 14 Drawing Sheets

(56) References Cited

U.S. PATENT DOCUMENTS

| | | | | |
|---|---|---|---|---|
| 4,212,193 A | * | 7/1980 | Turley | G01M 1/10 473/291 |
| 5,169,151 A | * | 12/1992 | Conley | A63B 69/3685 473/220 |
| 5,814,773 A | * | 9/1998 | Latiri | G01G 1/08 177/171 |
| 6,132,326 A | * | 10/2000 | Schweid | G01M 1/10 473/553 |

* cited by examiner

MECHANICAL STATIC AND DYNAMIC MEASURING DEVICE BASED ON A COMPOUND CANTILEVERED SYSTEM

CROSS-REFERENCE TO RELATED APPLICATIONS

This patent application claims the benefit of Taiwan Patent Application Ser. No. 106118689 filed on Jun. 6, 2017, which is incorporated herein in its entirety by this reference.

FIELD OF THE DISCLOSURE

The present invention relates to a compound cantilevered measuring device, in particular, a method, which can be easily used, to measure static mechanical properties of length, weight, center of mass (center of gravity) as well as dynamic mechanical property of the moment of inertia. This cantilevered measuring device applies to most swing-class sports equipment, such as golf clubs, baseball bat, jacquard, tennis racket, badminton racket, ping-pong racket

BACKGROUND OF THE DISCLOSURE

First of all, swing-class sports equipment or propeller rods, swing-class sports equipment, for example, which has a grip and a batting part. The user must hold the grip of a bat or a racket while he/she tries to hit the ball. The swing-class sports equipment has a certain length, a weight, a center of mass (center of gravity) and moment of inertia etc. The sport equipment manufacturers need to measure the above mechanical and related physical characteristics to help meet the sports specifications. The users, on the other hand, can better understand the swing-class sports equipment with accurate knowledge of mechanical characteristics and make them better players.

As shown in FIG. 1, the conventional swing-class sports equipment apparatus 1 includes a scale frame 11 and a first weight scale 12 and a second weight scale 13 provided on the scale frame 11. One end has an Abutting plate 111 which is provided with first support 112 and second support 113 on the opposite side of the abutting plate 111. The lower end of the first support 112 is on the first weight scale 12 and the second support 113 on the second weight scale 13.

As shown in FIG. 1, the baseball bat B is used to illustrate how this conventional tool works. The measuring procedure is as followed: The baseball bat B is to be placed on the scale frame 11 against the abutting plate 111 of the scale frame 11. The bat is lying in parallel to the scale frame 11. The distances L1 is the spacing between the first support 112 and abutting plate 111 while the distances L2 the spacing between the first support 112 and the second support 113. These two lengths must be in accordance with the International Baseball Specification.

As described above, when the distance L1 and L2 conform to the International Baseball Specification, the first weight scale 12 and the second weight scale 13 are then used to take measurement. The sum of the two weights is the total weight of the baseball bat B. Note that L1 and L2 must be measured by a meter and recorded manually. The center of mass the baseball bat B (center of gravity, GB) is then computed by using the two-point formulae $(L1 \times W1 + (L1+L2) \times W2)/(W1+W2)$.

The first support 112 and the second support 113 must be used to adjust the displacement, and the operator must first measure the two distances L1 and L2. The same person must calculate the total weight by the two weight readings. He then calculates the center of mass by using $(L1 \times W1 + (L1+L2) \times W2)/(W1+W2)$. The resulting swing-class sports equipment measuring device 1 is very inconvenient in the measurement. Moreover, the conventional swing-class sports equipment apparatus can only measure the length, weight and center of mass (center of gravity) of the baseball B. It cannot measure the baseball bat B's dynamic mechanical property such as the moment of inertia. Another Inertia swing cycle meter (not shown in the drawing) is needed to measure the dynamic property. Thus, the conventional tools cause difficulties in measurement and the measurement engineering.

Therefore, how to provide an integrated measuring device to enhance the convenience of swing-level sports equipment measurement has become a sports equipment manufacturers' problem waiting to be solved.

BRIEF SUMMARY OF THE DISCLOSURE

The main object of the present invention is to provide a compound cantilevered measuring device which will overcome the conventional measuring tools' inability to simultaneously measure the length, weight, center of mass (center of gravity) and moment of inertia of swing-class sports equipment which in term will result in the lack of measurement convenience.

The main technical means used in claim 1 of this invention, is to provide a compound cantilevered measuring device which comprises a base station, a weight station unit on a base station, the weight station unit comprising at least a first weight scale and a second weight scale. A mount station unit which is mounted on the weight station unit has a first mounting base, a second mounting base and a swing arm connector connected between the first mounting base and the second mounting base. The first mounting base is provided with an adjustable holding part at one end and a light blocking strip under the first mounting base. The second mounting base has a diamond bearing rod with one side of the swing arm connector attached to a spring. One end of this spring is provided with a link block while the other end is locked on the first mounting base, allowing the first mounting base to swing freely (on the horizontal plane) against the swing arm connector. Below the swing arm connector is a diamond bearing rod, the swing arm connector of the diamond bearing rod can be attached to the first weight scale of the seat. The diamond bearing rod on the second mounting base is attached to the second weight scale's seat. A calculation and display unit, electrically connected to the weight station unit, is located on one side of the base station. A swing sensor is mounted on the base station and is also electrically connected to the calculation and display unit. The swing sensor has a laser transmitter on one end and a light receiver on the other end. The first mounting base of the light blocking strip is located between the transmitter and the receiver.

The invention can be achieved by the main technical means of claim 1, wherein the base station unit is provided with a weight station unit and a digital meter unit, and the weight station unit is provided with a mount station unit and the weight station unit which connects a calculation and display unit.

The invention can facilitate the measurement of three static mechanical properties, the length, the weight, the center of mass (center of gravity) and one dynamic property of moment of inertia of the swing-class sports equipment.

DETAILED DESCRIPTION OF A PREFERRED EMBODIMENT

Figure 1:
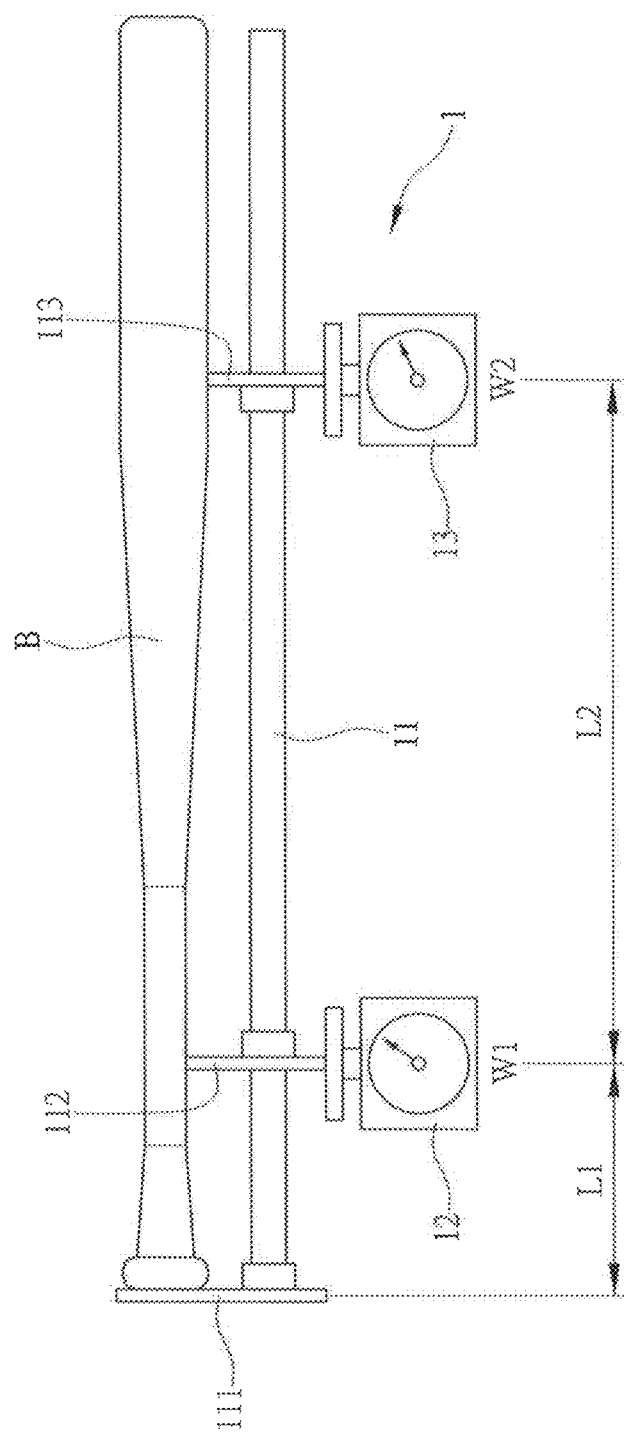
FIG. 1 shows the conventional swing-class sports equipment measuring device.
Figure 2:
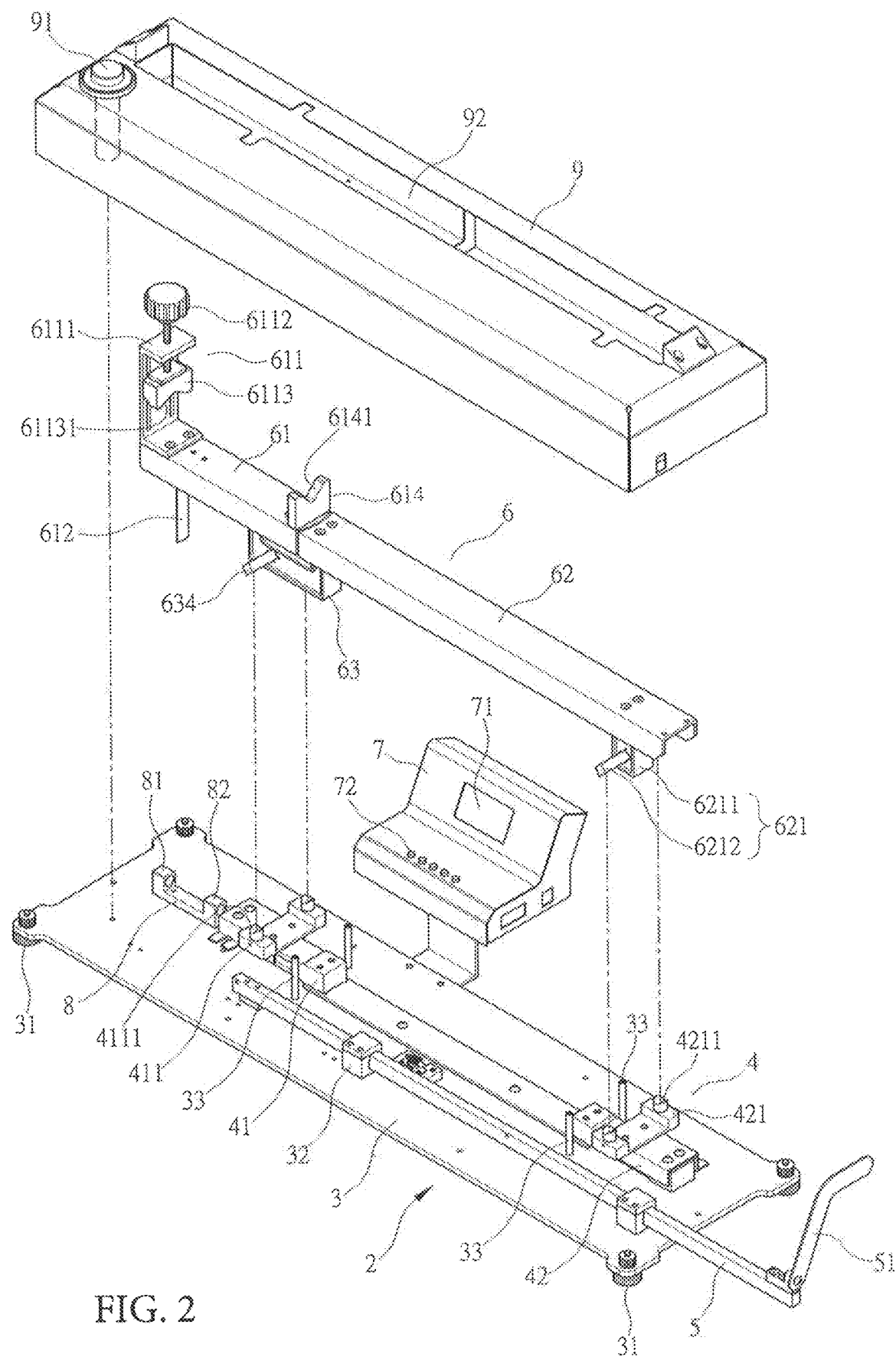
FIG. 2 shows an exploded view of the apparatus of the present invention.
Figure 5:
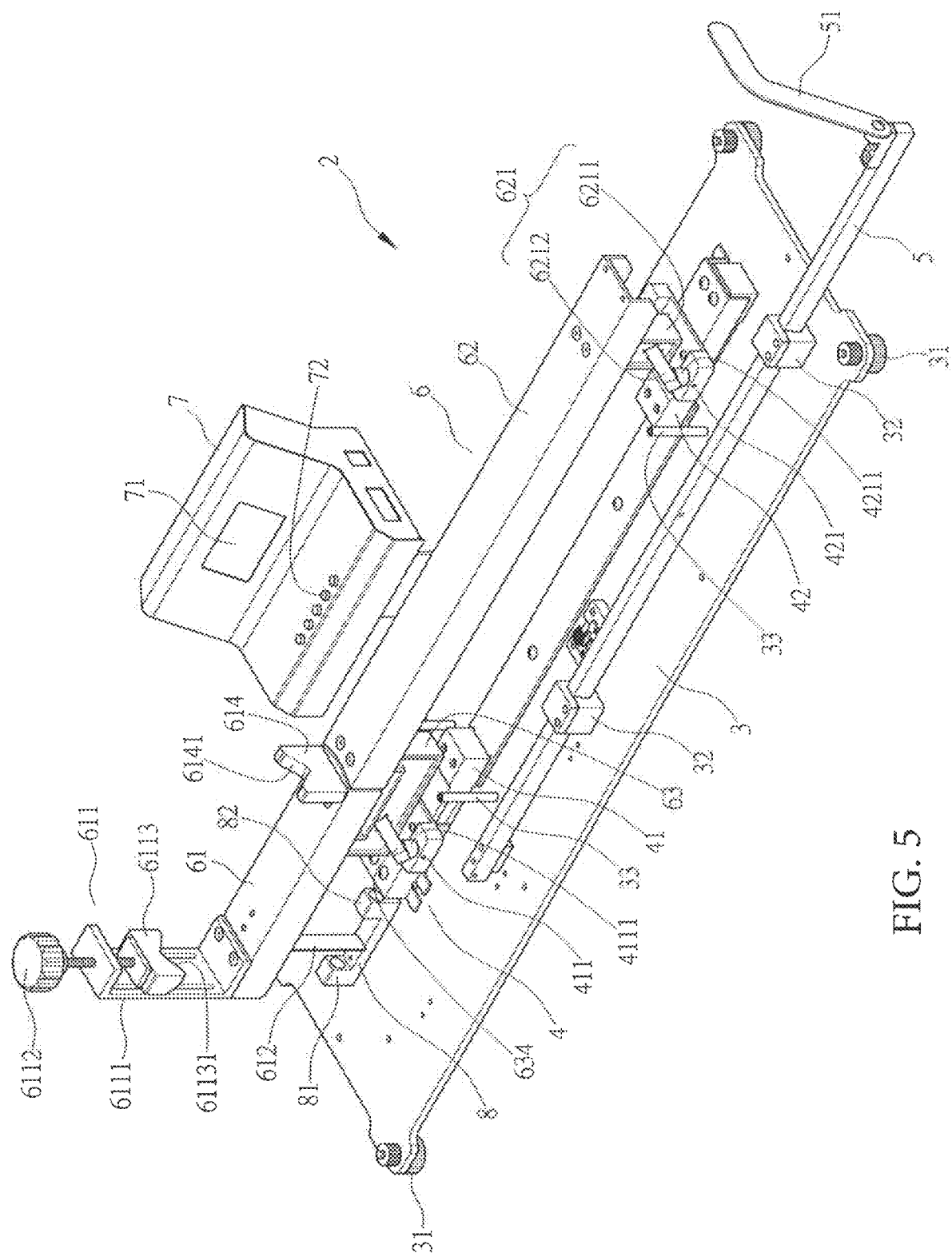
FIG. 5 is the proposed device group diagram without the cover body.
Figure 6:
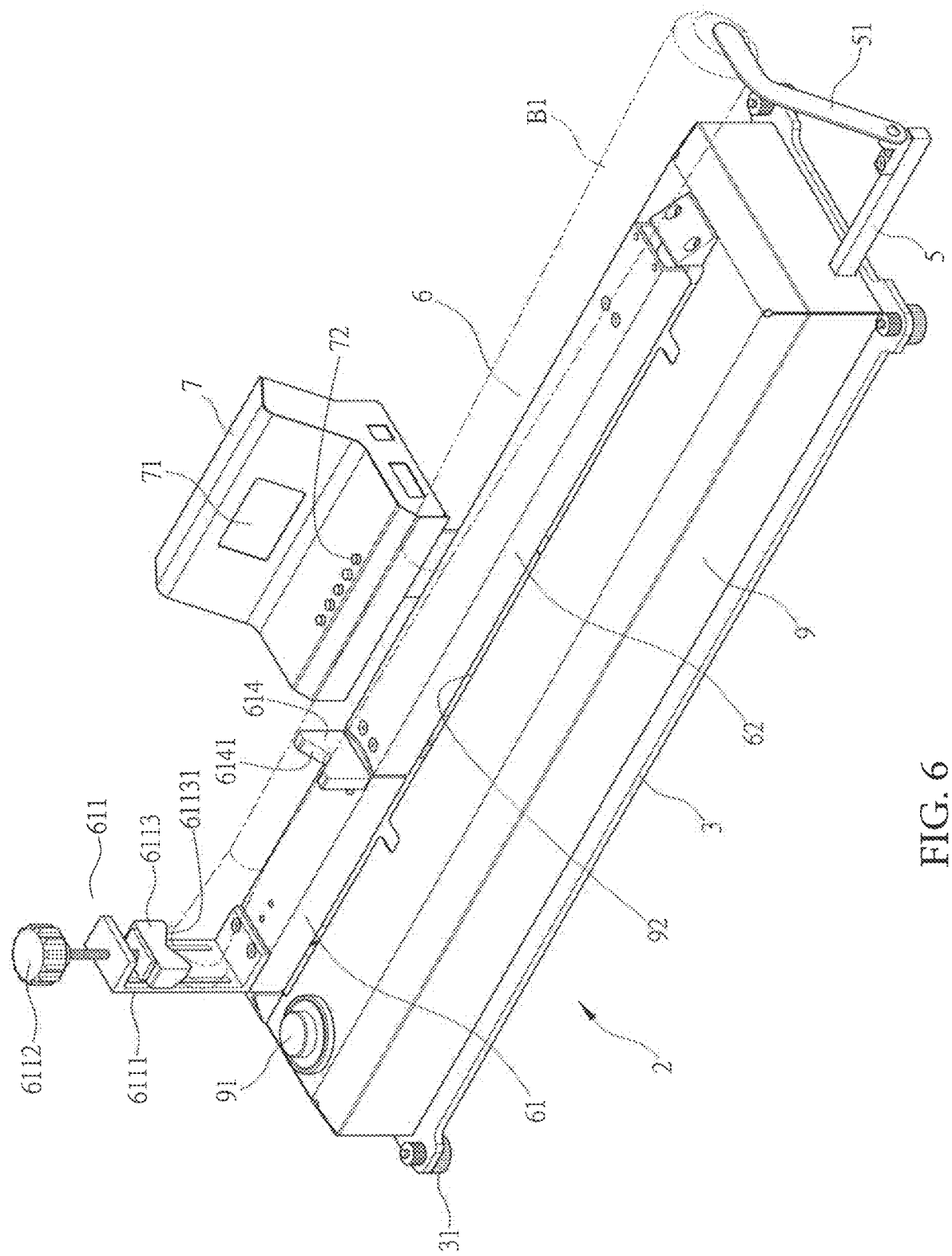
FIG. 6 is a perspective view of the apparatus of the present invention.
Figure 7:
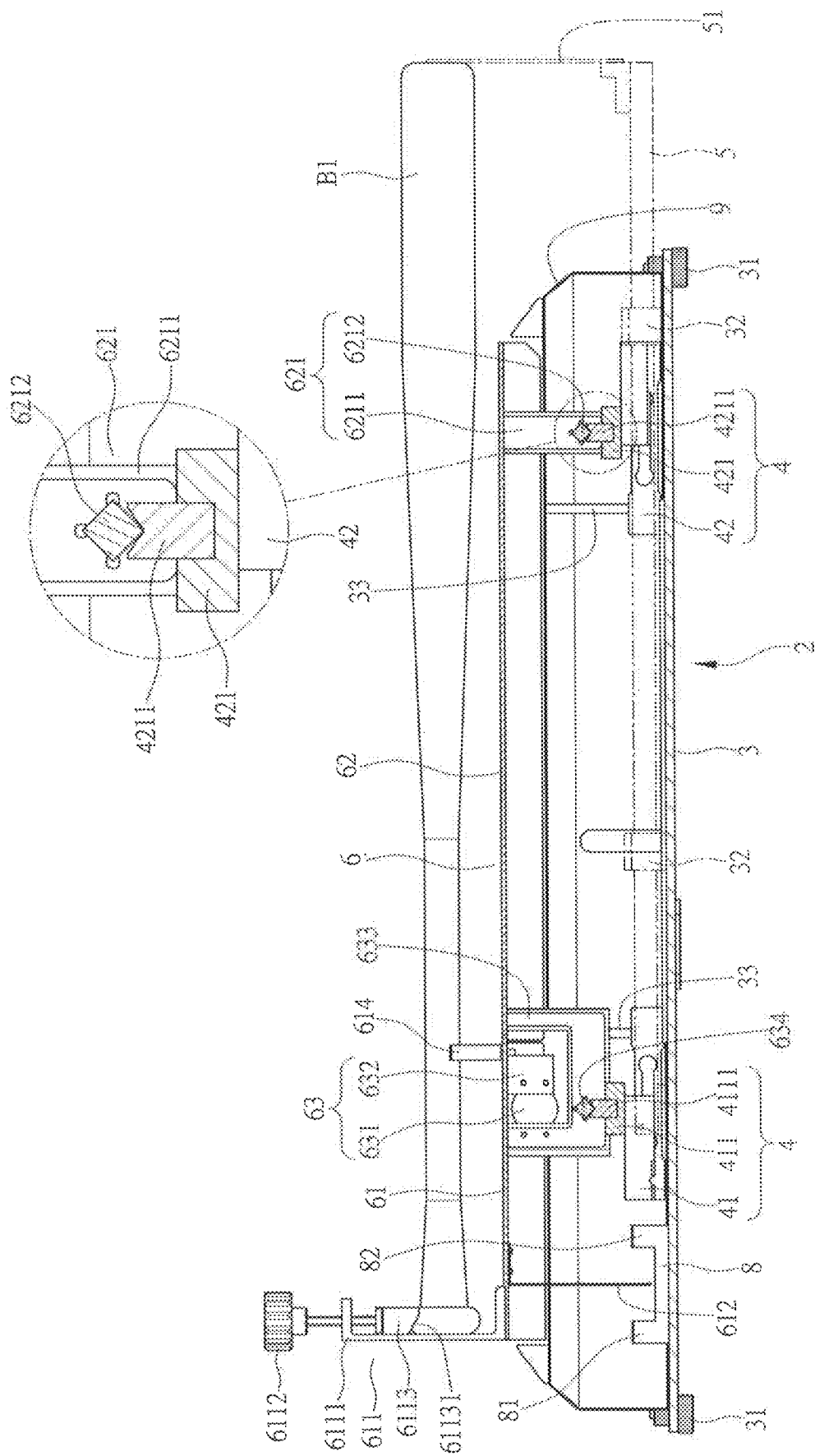
FIG. 7 shows an example of the apparatus of the present invention.
Figure 8:
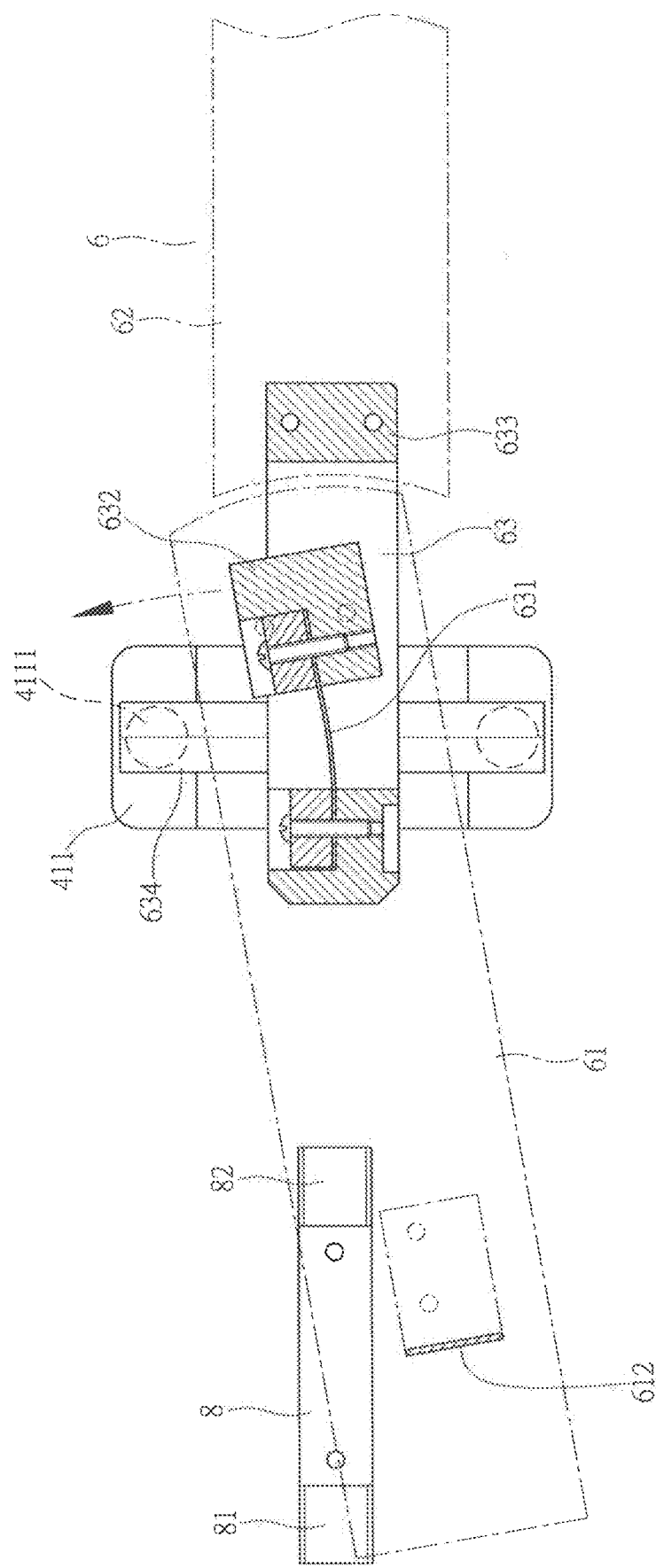
FIG. 8 shows the swing motion (to one side) of the first mounting base of the present invention.
Figure 9:
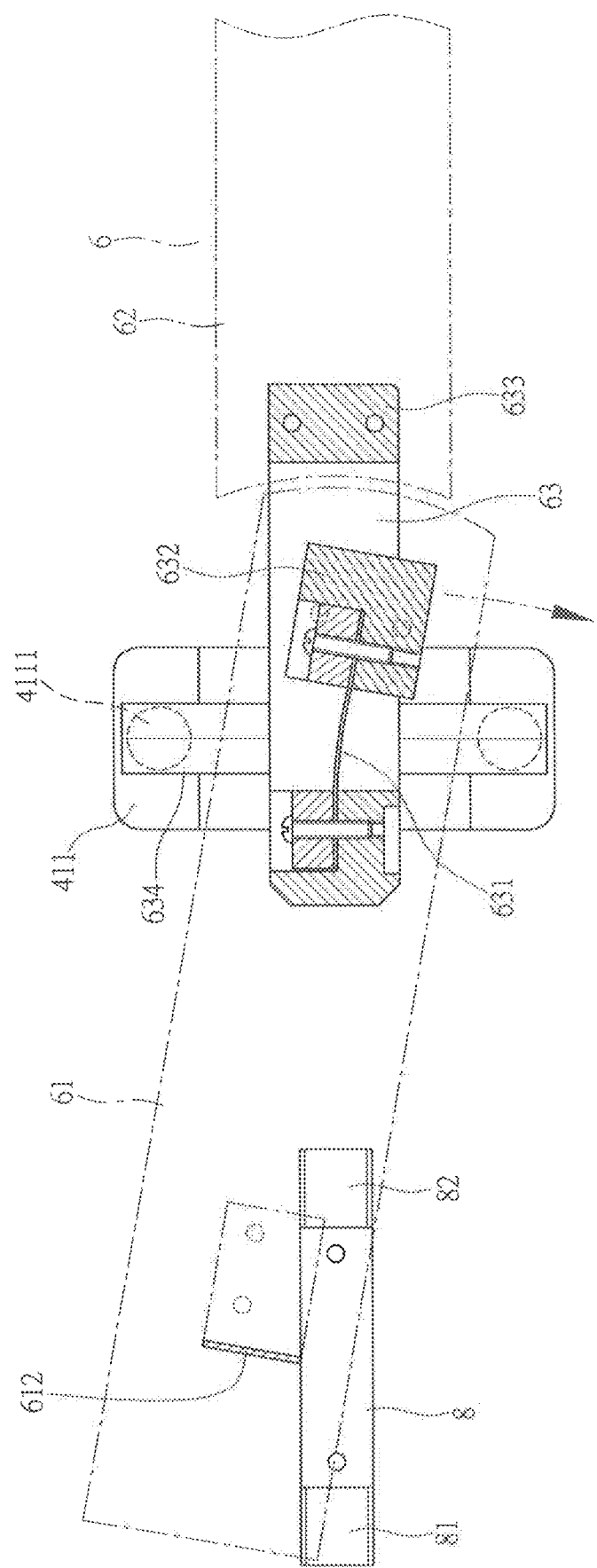
FIG. 9 shows the swing motion (to the other side) of the first mounting base of the present invention.
Figure 10:
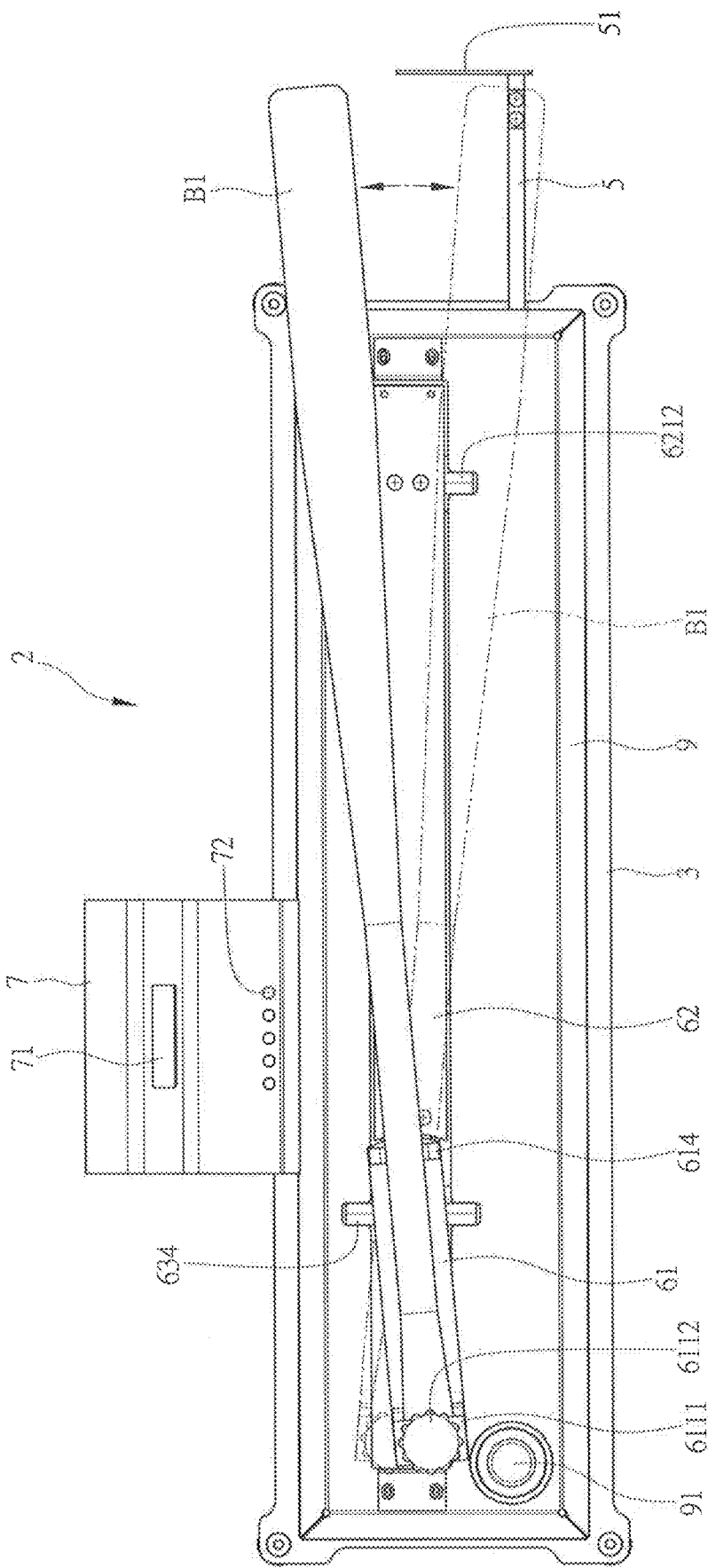
FIG. 10 shows the design of measuring the inertia swing cycle.

To help reviewing authority gain a better understanding of the structure and the effectiveness of the invention, we provide the schematic description as follows:

First, referring to FIGS. 2, 5 and 7, the cantilevered measuring device of the present invention comprises a base station 3, a weight station unit 4 which is on the base station 3, a base station 3 and a digital meter unit 5 located next to the weight station unit 4, a mount station unit 6 which is on the weight station unit 4 which is on one side of the base station 3 and is electrically connected to the calculation station and the display unit 7, a swing sensor 8 provided on the base station 3 and electrically connecting the calculation and display unit 7, and a cover body 9 which is sit on top of the base station 3.

As shown in FIGS. 2, 5, 6 and 7, the base station 3 is a rectangular body with four adjustable support foot pads 31 located at the four corners, which is used to adjust the level of the base station 3. One side of the base station 3 is provided with two insert blocks 32 along the long axis, which can be inserted by the digital meter unit 5, meaning that the digital meter unit 5 can slide freely within the insert block 32, and the base station 3 is provided with a weight station unit 4 along the long axis side of the side of the insert block 32, which has two swing motion stop columns 33 that are located near the weight station unit 4.

As shown in FIGS. 2, 5 and 7, the weight station unit 4 is located at the center of the base station 3 and includes a first weight scale 41 and a second weight scale 42. The first weight scale 41 and the second weight scale 42 are electrically connected to the calculation and display unit 7, whereby the weight value measured by the first weight scale 41 and the second weight scale 42 can be displayed at the calculation and display unit 7. The first weight scale 41 is provided with a seat 411 having a V-shaped seat mount 4111 at its upper end and a second bearing scale 421 having a V-shaped seat mount 4211.

As shown in FIGS. 2, 5, 6 and 7, the digital meter unit 5 is inserted through the insert block 32 of the base station 3. The length of device under test may be measured by slipping the meter through insert block 32. The end of the digital meter unit 5 is fitted with a true-zero end hook 51 to facilitate the measurement.

Figure 3:
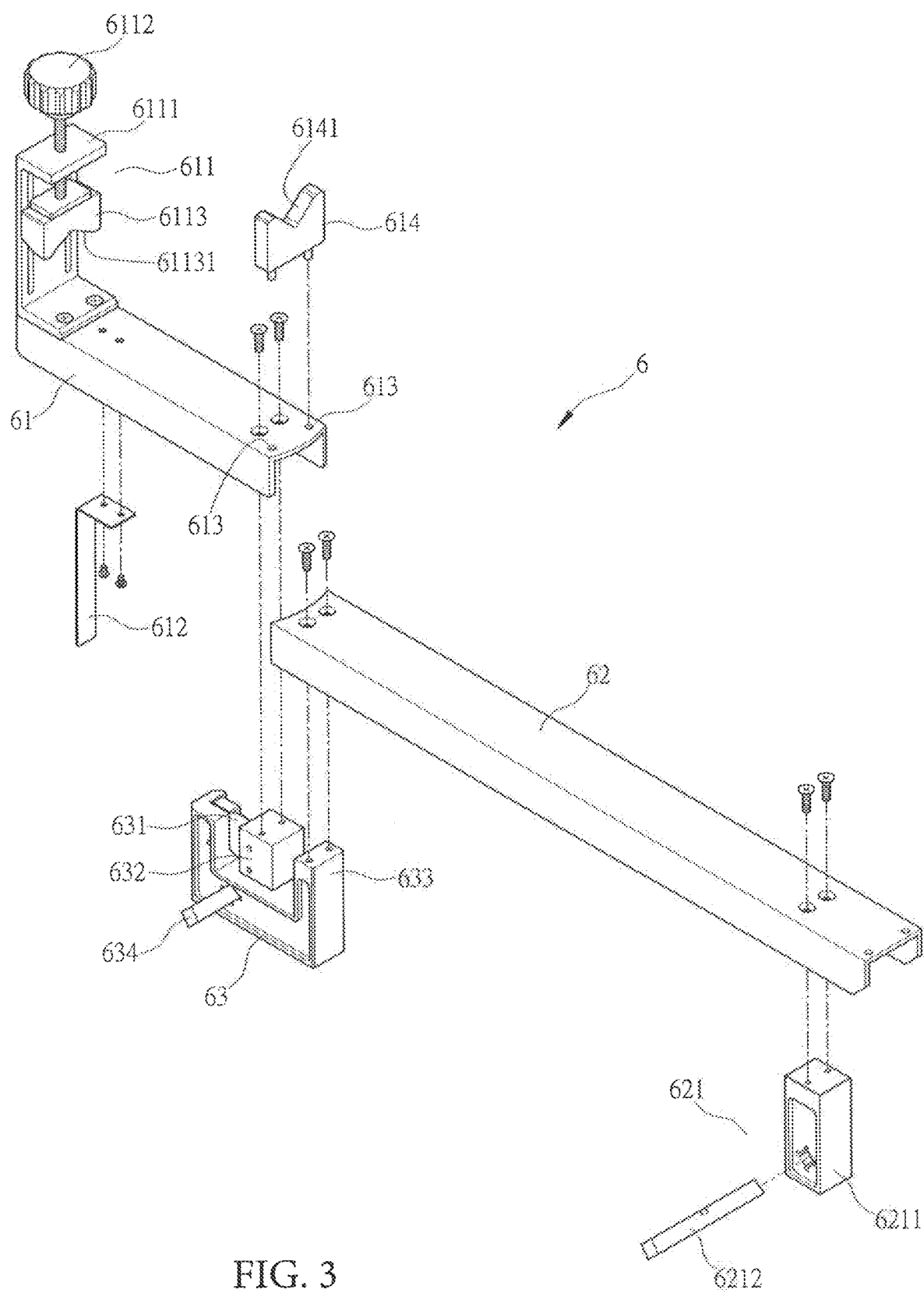
FIG. 3 shows an exploded view of the mount station unit of the measuring device of the present invention.
Figure 4:
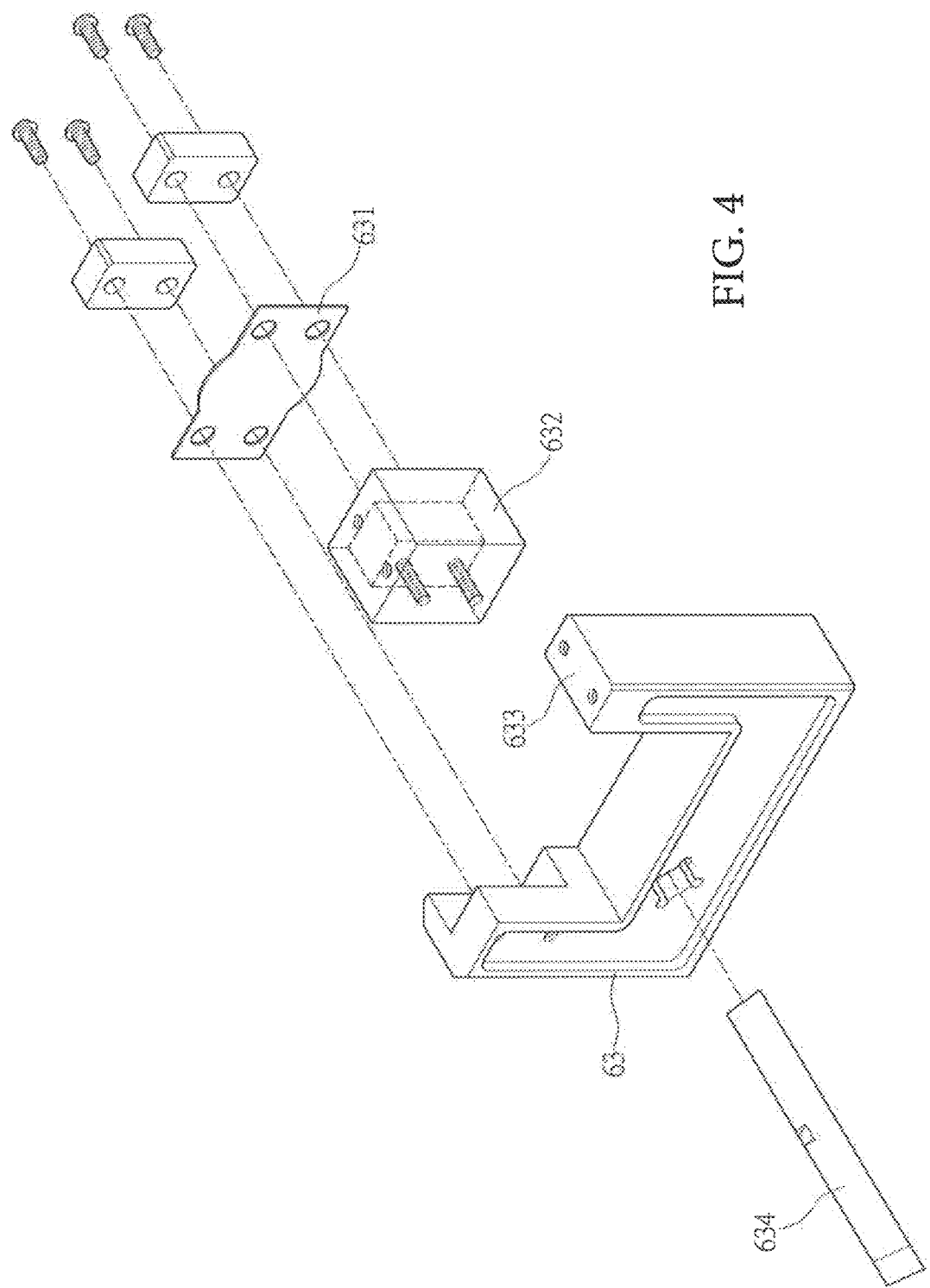
FIG. 4 shows an exploded view of the swing arm connector of the mount station unit of the present invention.

As shown in FIGS. 2, 3, 4, 5, 6 and 7, the mount station unit 6 is mounted on the weight station unit 4. The mount station unit 6 has a first mounting base 61, a second mounting base 62 and a swing arm connector 63 connected between the first mounting base 61 and the second mounting base 62. At one end of the first mounting base 61 is an adjustable holding part 611 which is mounted on a fixed frame 6111 has a tension screw 6112 and a clamping member 6113 which are connected to the fixed frame 6111 and the lower end of the shaped pressing block 6113. The bottom end of the V-shaped pressing block 6113 is provided with an inclined pressing surface 61131. The first mounting base 61 is provided with a light blocking strip 612. FIG. 3 shows the other side of the holding part 611 are two insert holes 613 which provide an anchor for the support 614. And at the upper end of the support 614 is the V-shaped support 6141 used to hold the device under test as is shown in FIG. 7.

As shown in FIGS. 2, 3, 5, 6 and 7, the second mounting base 62 is provided with a bearing assembly 621 having a bearing support 6211 and a diamond bearing rod 6212. The bearing support 6211 is locked onto the second mounting base 62 towards the end of the base station 3. The diamond bearing rod 6212 is pivotable on the seat 421 of the second weight scale 42 as is indicated in FIG. 2.

As shown in FIGS. 2, 3, 4, 5 and 7, the swing arm connector 63 is a U-shaped body having one end indirectly connected to the first mounting base 61 and the other end on the second mounting base 62. FIG. 3 shows that the swing arm connector 63 is provided with a spring 631. This spring is indirectly linked to the first mounting base 61 through the link block 632 which is locked firmly onto the first mounting base 61. The spring 631 is provided here so that first mounting base 61 is free to swing on the swing arm connector 63, i.e. the first mounting base 61 is connected to the swing arm connector 63 in a cantilever condition. More specifically, the first mounting base 61 is pushed in the horizontal direction by the elastic force of the spring 631 which is powered by the horizontal pushing or pulling forces of the swing arm connector 63. As a result, the swing arm connector 63 is provided with a second mounting-base frame 633 at the other end of the link block 632, which is firmly attached to the second mounting base 62. The first mounting base 61 is connected to the link block 632, the second mounting base 62 is connected the second mounting base 633. Mounting bases 61 and 62 form a complete mount station unit 6.

We also have the following facts: The first mounting base 61 is free to swing. The lower side of the swing arm connector 63 is provided with a diamond bearing rod 634. The diamond bearing rod 634 is pivotable on the seat 411 of the first weight scale 41. The diamond bearing rod 634 of the swing arm connector 63 is seated on the seat 411 of the first weight scale 41. The diamond bearing rod 6212 of the second mounting base 62 is seated on the seat 421 of the second weight scale 42. The mount station unit 6 overlaps the weight station unit 4 and maintains a certain distance from the base station 3.

As shown in FIGS. 2, 5, 6 and 7, the calculation and display unit 7 is located on the side of the base station 3 and, more specifically, the calculation and display unit 7 is set at the base station 3 on the opposite side of the digital meter unit 5. The calculation and display unit 7 has a display 71 and a several key pads 72. The calculation and display unit 7 is electrically connected to the weight station unit 4 and the swing sensor 8. Thus, the numerical weight measured by the weight station unit 4 and the period of motion measured by the swing sensor 8 may be calculated and displayed on the display 7. From these numbers and the spring's elastic constant we may obtain the weight, the center of mass (center of gravity) and the period of motion cycle with of the swing-class sports equipment under test. The dynamic mechanical property of the moment of inertia and other static information are simultaneously obtained with this invention. The key pad 72 can control the calculation and action of display unit 7.

As shown in FIGS. 2, 5 and 7, the swing sensor 8 is located on the base station 3 and is located below the first mounting base 61 of the mount station unit 6, which has a transmitter 81 and a receiver 82, the light blocking strip 612 of the first mounting base 61 is located between the transmitter 81 and the receiver 82 of the swing sensor 8, whereby the light blocking strip 612 is associated with the first mounting base 61, the blocking effect is generated between the transmitter 81 of the swing sensor 8 and the receiver 82, which in turn enables the swing sensor 8 to count the number and duration of blocking and the message 71 to the electrical connection of the display 71 is calculated and displayed in terms of cycling period $T=2\pi\sqrt{(I/K)}$ (I is the moment of inertia of the device under test, K is the spring's elastic constant) to calculate and display the inertia swing cycle of the measured object. The swing sensor 8 is implemented with a laser transmitter-receiver detection system to improve measurement accuracy of the swing sensor 8.

As shown in FIGS. 2, 5, 6 and 7, the cover body 9 is mounted on the base station 3. It covers most part of weight station unit 4, the mount station unit 6, the swing sensor 8 and the digital meter unit 5. The cover body 9 is
equipped with a bull's eye level 91, which ensures good leveling of the base station 3 by the bull's eye level 91. An open long slot 92 of the cover body 9 is located near the center so that the mount station unit 6, which holds the device under test, is exposed outside the cover body 9.

As shown in FIGS. 5, 6, 7, 8, 9 and 10, the implementation of the present invention is illustrated by using a baseball bat B1's as the swing-class sports equipment. First we insert the support 614 of the mount station unit 6 on the insert hole 613. We make sure that the distance between the support 614 and the holding part 611 conforms to the specification of the International Baseball bat measuring rules. We set the baseball bat B1 on the support 614 of the mount station unit 6, where the knob of the baseball bat B1 touches the fixed frame 6111 of the holding part 611. The V-shaped pressing block 6113 is then pressed against the baseball bat. By tightening the adjustment screw 6112 we make the V-shaped pressing block 6113 continuously apply pressure to the knob of the baseball bat B1. At this time the V groove 61131 of the V-shaped pressing block 6113 is inclined so that the knob of the baseball bat B1 may be pushed down while touching the fixed frame 6111. By tightening or loosening the adjustment screw 6112, the baseball bat B1 can be maintained in a position parallel to the mount station unit 6.

Figure 11:
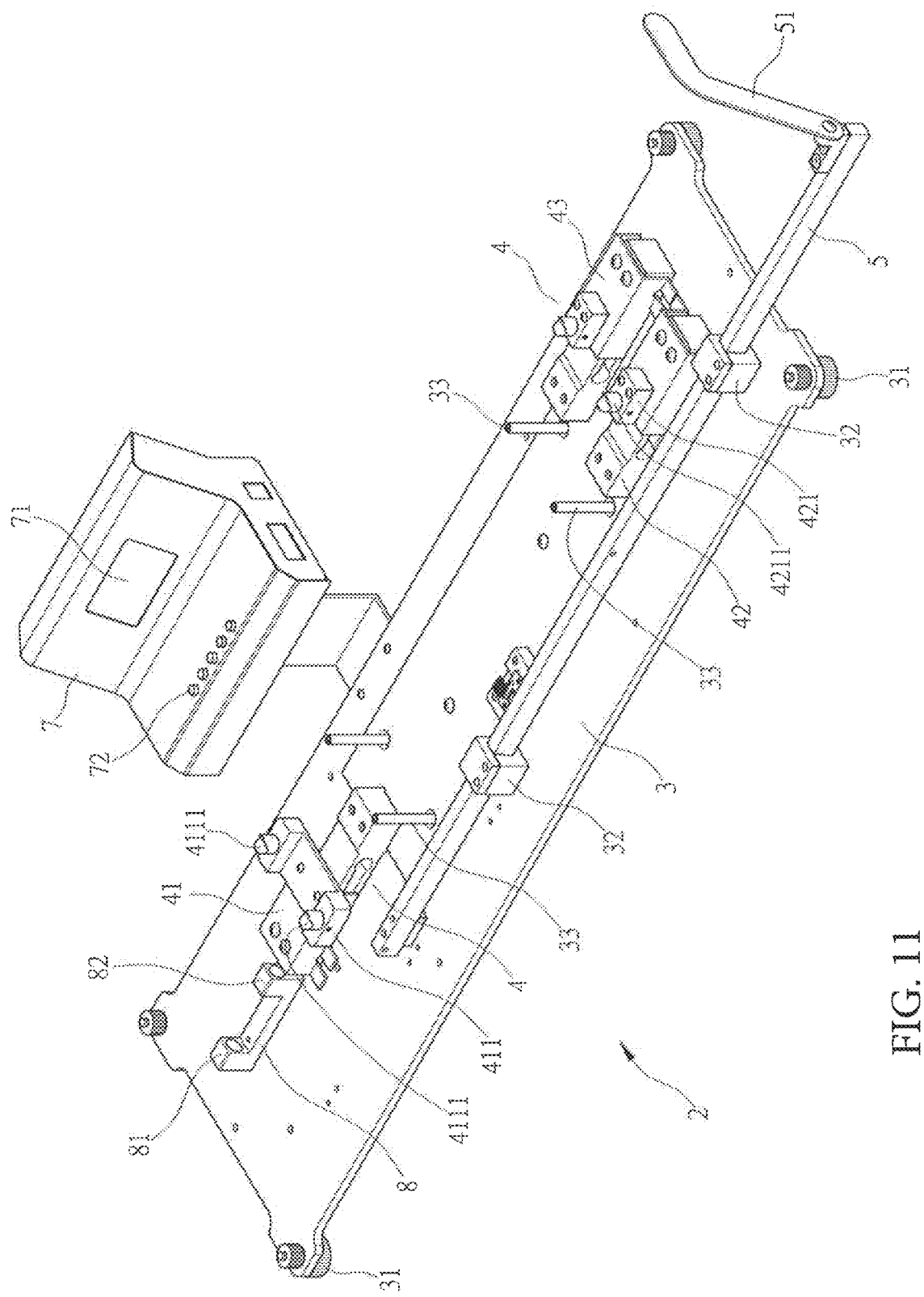
FIG. 11 shows an implementation of the three weight station units for measuring the center of mass of the device under test.
Figure 12:
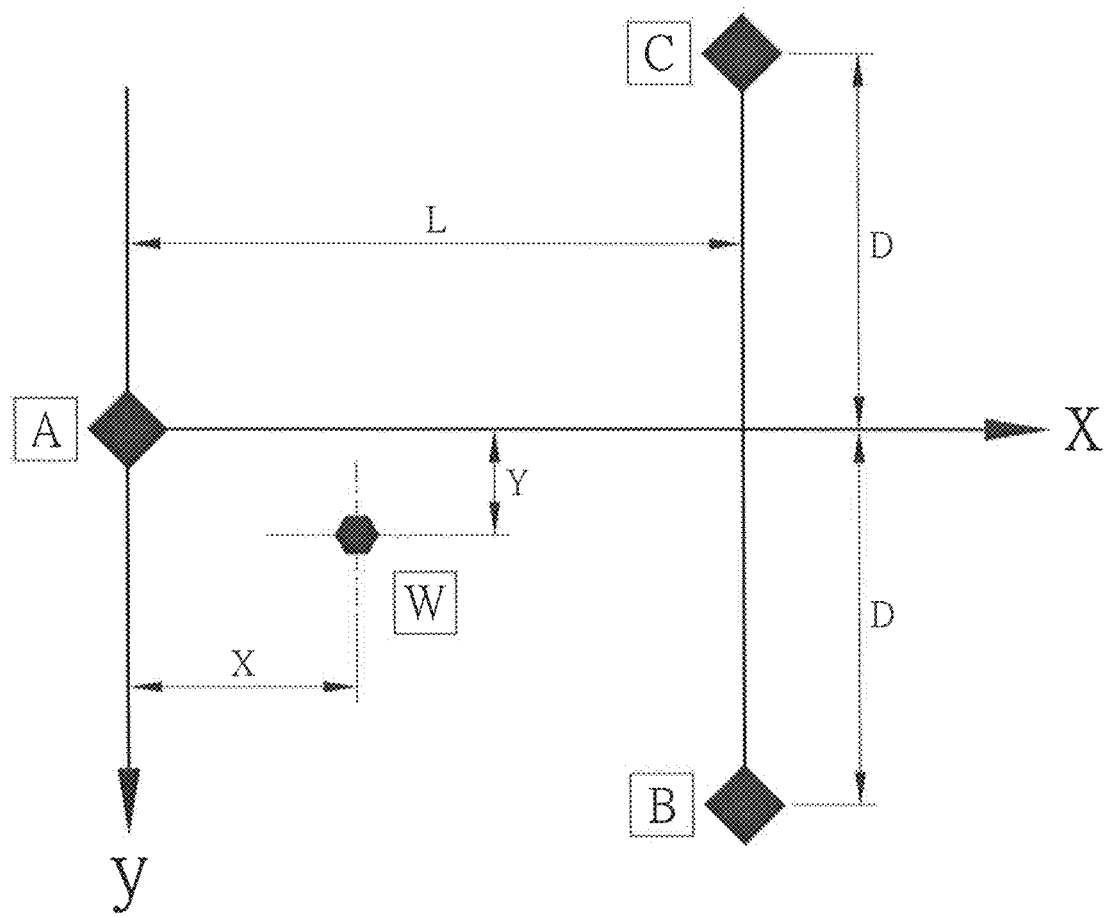
FIG. 12 shows the pertaining parameters for center-of-mass calculation of the three weight station units.

At this balanced position, we may take readings of weight station unit 4 which will be calculated and shown on displayed unit 7. The total weight of the baseball bat and its center of mass (center of gravity) are obtained. After we slide the meter rod until the true-zero end hook 51 touches the cap of the bat, the length of the baseball bat B1 can be obtained from the readout of the digital meter. When the weight of the baseball bat B1 is measured and the information of the center of mass (center of gravity) is in hand, the moment of inertia can be deduced from the inertia swing cycle. In the present invention, the measurement engineer simply swings or sways back and forth the first mounting base 61 of the mount station unit 6. The light blocking strip 612 under the first mounting base 61 blocks the light emitting from the transmitter 81 from arriving at the light detecting receiver 82. This in terms generates on-off electrical pulses which are then passed to the electrical connection of the display 71 to calculate and display the measured inertia swing cycle. As shown in FIGS. 11 and 12, the second implementation of the new invention calls for three weight station units. We add the third weight station unit 43 in addition to the first weight scale 41 and the second weight scale 42. The new configuration allows us to measure the center of mass of general swing-class sports equipment such as the tennis racket. Let W be the total weight, MX and MY be the total moment against the x- and y-axis. If A is the reading of the first weight scale, B is the reading of the second weight scale, C is the measurement of the third station scale, L is the x-coordinate of the swing-class sports equipment and Y is the y-coordinate, we have: $W=A+B+C$, $MX=(B+C)$ $L-WX=0$, $MY=(C-B)$ $D-WY=0$. From these equations we calculate the x and y coordinate of the center of mass (center of gravity) using the following equations: $X=(B+C)$ $L/W$, $Y=(B-C)$ $D/W$.

Figure 13:
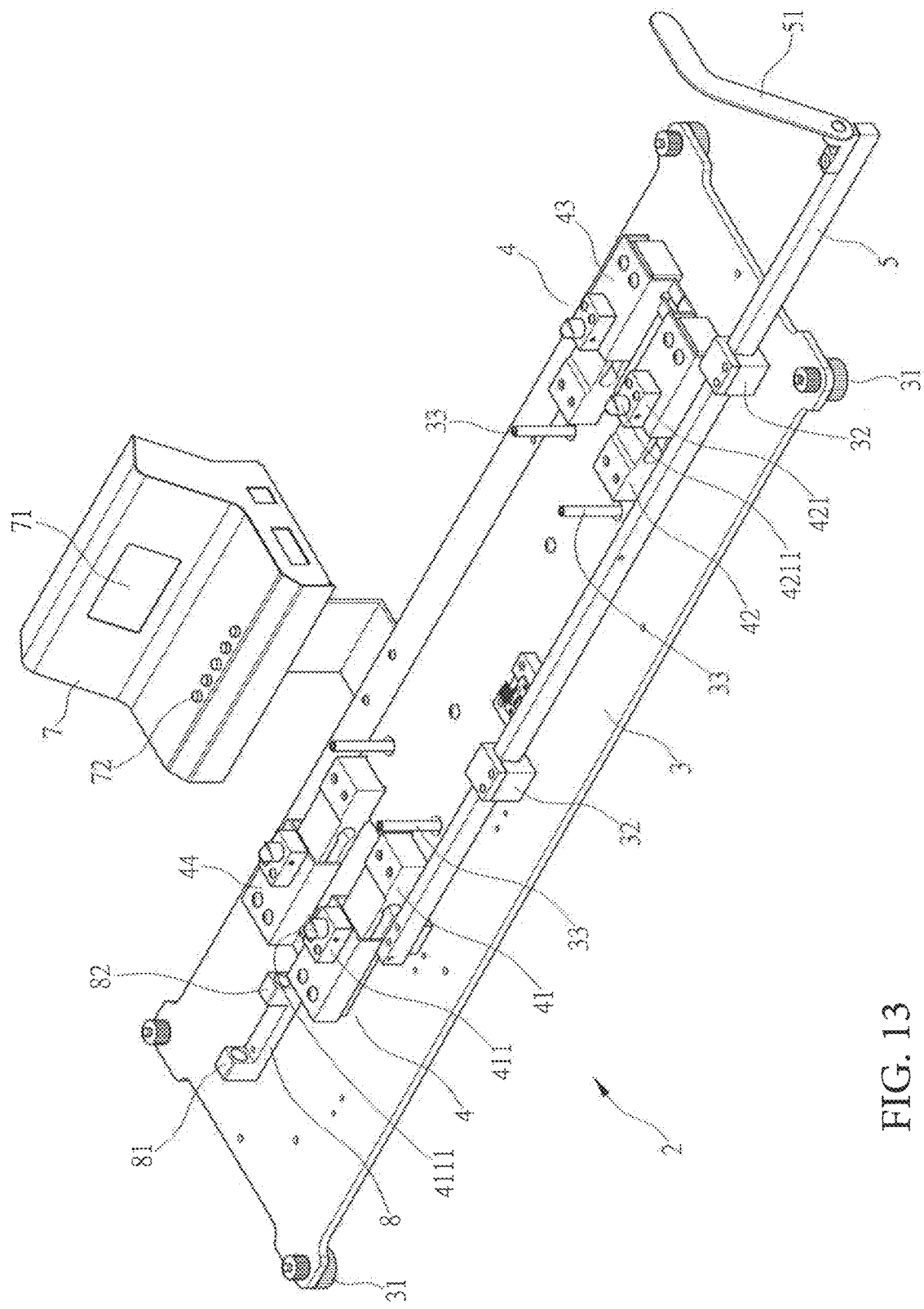
FIG. 13 shows an implementation of the four weight station units for measuring the center of mass of the device under test.
Figure 14:
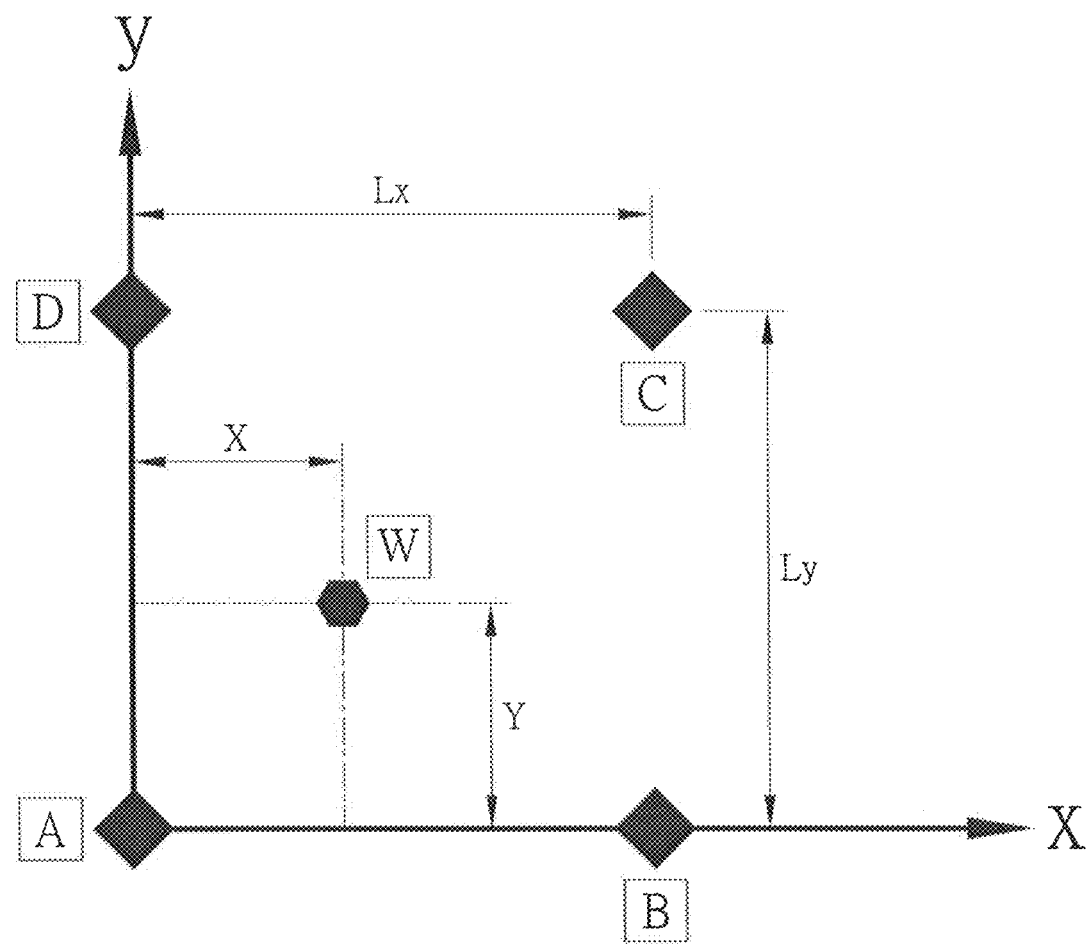
FIG. 14 shows the pertaining parameters needed for center-of-mass calculation of the four weight station units.

As shown in FIGS. 13 and 14, the third implementation of the new invention calls for four weight station units. We add the forth weight station unit 44 in addition to the first weight scale 41, the second weight scale 42 and the third weight scale 43. The new configuration allows us to measure the center of mass of general swing-class sports equipment such as the tennis racket. Let W be the total weight, MX and MY be the total moment against the x- and y-axis. If A is the reading of the first weight scale, B is the reading of the second weight scale, C is the measurement of the third station scale, D is the measurement of the forth station scale, L is the x-coordinate of the swing-class sports equipment and Y is the y-coordinate, we have: $W=A+B+C+D$, $MX=(B+C)$ $Lx-WX=0$, $MY=(A+D)$ $Ly-WY=0$. From these equations we calculate the x and y coordinate of the center of mass (center of gravity) using the following equations: $X=(B+C)$ $Lx/W$, $Y=(C+D)$ $Ly/W$.

The invention contains a weight station unit 4, a digital meter unit 5 and a swing sensor 8 are provided on the base station 3 and the mount station unit 6. The mount station unit 6 is made of the first mounting base 61, a second mounting base 62 and a swing arm connector 63 which are free to swing on one end side of the swing arm connector 63. The weight station unit 4 and the swing sensor 8 are electrically connected to the calculation and display unit 7. All of these can facilitate measuring swing-class sports equipment's three static mechanical properties, namely the length, the weight, the center of mass (center of gravity) and one dynamic mechanical property of the moment of inertia. The merit of the present invention lies in that the utility of the compound cantilevered measuring device can be improved.

The present invention achieves new level of success by above construction in that the calculation and display unit 7 can automatically calculate the weight of the device, the center of mass and the dynamic inertia of swing-class sports equipment. Digitized numbers are displayed to facilitate measurement and viewing of data.

Additional benefit of above construction of the present invention is that the digital meter unit 5 and the true-zero end hook 51 can accurately and conveniently measured by the length of the object.

In view of the above material, the present invention has achieved the set goals by this cantilevered measuring device which has been described in full detail. It meets the patent requirements of novelty, practicability and progress. We hence make an application for invention patent according to the law. We plead, with deep appreciation, that the honorable examination officer to grant us the invention of the patent certification.

The invention claimed is:

1. A measuring device, comprising:
   a base station,
   a weight station unit provided on the base station, the weight station unit comprising at least a first weight scale and a second weight scale, the first weight scale having a first seat and the second weight scale having a second seat;
   a controller associated with the base station;
   a mount station unit connected to the weight station unit and having a first mounting base, a second mounting base, and a swing arm connector containing a spring, the swing arm connector swingably connecting the first mounting base and the second mounting base;
   wherein the first mounting base is moveably supported on the first weight scale, and wherein the second mounted base is moveably supported on the second weight scale;
   an adjustable holding part disposed at one end of the first mounting base;
   a support disposed at another end of the first mounting base adjacent the swing arm connector;
   a motion sensor associated with the base station and a digital meter and configured to sense motion of the first or second mounting base; and
   a meter unit associated with the base station and associated with the controller;
   wherein a sports article is mountable on the first mounting base between the adjustable holding part and the support; and
   wherein the controller operates to determine a length, a weight, a center of gravity and an inertia swing cycle of the sports article based on signals provided by the meter unit, the first weight scale, the second weight scale and the motion sensor.

2. The measuring device of claim 1, wherein each of the first and second mounting bases further includes a diamond-shaped bearing rod that slidably engages, respectively, the first seat and the second seat.

3. The measuring device of claim 1, wherein the adjustable holding part includes a fixed frame, an adjusting screw and an inverted, V-shaped, pressing block, and wherein the support includes a V-shaped groove facing opposite the pressing block.

4. The measuring device of claim 1, further comprising a first pair of stops connected to the base and disposed on either side of the first mounting base, and a second pair of stops connected to the base and disposed on either side of the second mounting base, wherein the first and second pairs of stops limit a swinging motion of the first and second mounting bases.

5. The measuring device of claim 1, wherein the meter unit is slidable relative to the base and includes a true-zero end hook at one end, and wherein the meter unit is configured to provide the length based on a distance between the true-zero end hook and the adjustable holding part.

6. The measuring device of claim 1, wherein the motion sensor is a laser light sensor.

7. The measuring device of claim 1, further comprising a cover that is disposable on the base unit, the cover including a levelling device.

8. The measuring device of claim 1, further comprising a third weight scale, wherein the second mounting base is further moveably supported on the third weight scale.

9. The measuring device of claim 8, further comprising a fourth weight scale, wherein the first mounting base is further moveably supported on the fourth weight scale.

10. The measuring device of claim 1, wherein the first and second weight scales are electronic weight scales.

11. A method for measuring parameters of a sports equipment article, comprising:
    mounting the article onto a support disposed at one end of a first mounting base adjacent a swing arm connector that includes a spring;
    securing an end portion of the article on an adjustable holding part disposed at another end of the first mounting base such that the article is cantilevered beyond the support over a second mounting base that is swingably connected to the first mounting base at the swing arm connector;
    moveably supporting the first mounting base on a first weigh scale;
    moveably supporting the second mounting base on a second weigh scale;
    adjusting a position of a meter scale such that a true zero is aligned with a free end of the article;
    providing a motion sensor disposed to measure a swing period of the first and second mounting bases relative to a base station;
    inducing a swinging motion on the article and, during the swinging motion:
    determining a weight of the article by monitoring the first and second weigh scales;
    determining a center of gravity location of the article by monitoring the first and second weigh scales;
    determining a length of the article based on the position of the meter scale; and
    determining an inertia swing cycle of the article based on a period determined by a signal from the motion sensor.

12. The method of claim 11, wherein moveably supporting each of the first and second mounting bases further includes providing a diamond-shaped bearing rod that slidably engages, respectively, the first seat and the second seat.

13. The method of claim 11, wherein securing the end portion of the article on the adjustable holding part includes providing a fixed frame, an adjusting screw and an inverted, V-shaped, pressing block, and adjusting the adjusting screw to engage the end of the article with the pressing block.

14. The method of claim 13, wherein mounting the article onto the support includes placing a section of the article into a V-shaped groove formed in the support.

15. The method of claim 11, further comprising limiting a swing of the first and second mounting bases by providing a first pair of stops disposed on either side of the first mounting base, and a second pair of stops disposed on either side of the second mounting base.

16. The method of claim 11, wherein the meter scale operates to measure a distance between the true-zero and the adjustable holding part.

17. The method of claim 11, wherein the motion sensor is a laser light sensor and wherein the first mounting base includes a light interrupter such that the period is determined as the time between interruptions of a laser beam received at a receiver while the first and second mounting bases are swinging.

18. The method of claim 11, further comprising providing a cover that is disposable on the base unit, the cover including a levelling device, wherein the method further includes leveling the first mounting base and the second mounting base.

19. The method of claim 11, further comprising providing a third weight scale, wherein the second mounting base is further moveably supported on the third weight scale.

20. The method of claim 19, further comprising providing a fourth weight scale, wherein the first mounting base is further moveably supported on the fourth weight scale.

\* \* \* \* \*